March 12, 1957     W. R. HARDING     2,785,326

DYNAMOMETER CONTACT KNIFE BLADE

Filed July 15, 1954

INVENTOR
William R. Harding
BY
Paul E. Friedemann
ATTORNEY

United States Patent Office 2,785,326
Patented Mar. 12, 1957

2,785,326

DYNAMOMETER CONTACT KNIFE BLADE

William R. Harding, Ebenezer, N. Y., assignor to Westinghouse Electric Corporation, East Pittsburgh, Pa., a corporation of Pennsylvania Application July 15, 1954, Serial No. 443,595

7 Claims. (Cl. 310—93)

This invention relates to electrical connecting devices, and more particularly to electrical connectors for rotating electrical machines that measure the torque delivered by, or the torque required to drive, a rotating piece of machinery.

To measure either the torque delivered by an engine or motor, or the torque to drive a rotating piece of machinery, it has been common practice to use a dynamometer, which is a D. C. or A. C. motor with its frame or stator mounted on trunnion bearings so that it is free to rotate. Rotation is then prevented by a retarding force, which is usually a spring or platform scale. The turning force exerted on the stator is measured on the scale in pounds or other desired units, and the torque is obtained by multiplying this figure by the known length of lever arm of the turning force.

In order to obtain accurate measurements, it is necessary that the frame be balanced and free to rotate with a minimum amount of retardation exerted thereon by friction in the bearings and other forces. In this connection, attention must be devoted to the power leads conducting electrical energy to the machine, inasmuch as considerable retarding force may be exerted thereby. Obviously, direct connection of the leads to the windings in the stator is undesirable because flexure thereof resulting from the slight rotation of the frame produces sufficient indeterminable counter-torque to lead to considerable inaccuracy in the torque measurements. Other expedients that have been followed, such as the use of brush riggings, likewise are unsatisfactory because of the friction between the brush and the slip rings or other contact members used therewith.

In my invention, a blade-like member adapted to be affixed to the outer stator member of the electrical machine is provided with a matching reservoir filled with a conductive fluid, such as mercury. The blade is adapted to be affixed to the frame or shell of the machine but is insulated therefrom, and is electrically connected to the stator windings. The mercury reservoir is electrically connected to an external power source or to an electrical load. The blade is free to rotate with the machine stator relative to the reservoir; the only frictional opposition offered to movement of the blade is the infinitesimal amount between blade and mercury pool. At critical speeds of the rotating machine connected to the rotor of the dynamometer, vibrations set up by the system will tend to splash mercury out of the reservoir. It has been found that this condition can be alleviated by dividing the edge of the blade projecting into the liquid into a plurality of pins or fingers of small cross-section, so that the blade can move in any direction without disrupting the mercury pool.

One object of this invention is to provide electrical connections for the stator windings of a dynamometer that will exert a minimum of opposition to the movement of the stator frame.

Another object is to provide an electrical connection for the stator windings of the dynamometer, wherein one member is free to rotate with the shell or frame thereof without affecting the accuracy of the torque measurements obtained therewith.

Still another object is to provide an electrical connection for dynamometers of the type having a conductive blade in contact with a pool of mercury or other conductive liquid, wherein the mercury pool will not be disrupted by vibration of the dynamometer.

Other objects and features of my invention will become apparent upon consideration of the following detailed description when taken in connection with the accompanying drawing, in which.

Figure 1:
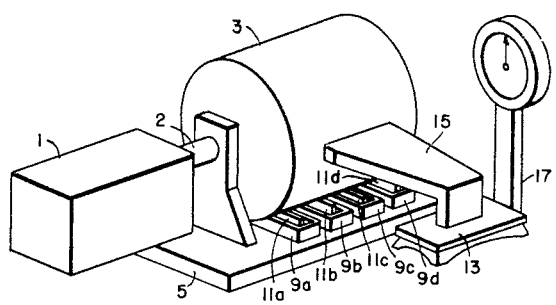
Figure 1 is a perspective view of a dynamometer incorporating the electrical connection which is the subject matter of my invention.

With reference to Fig. 1, there is shown a rotating electrical machine 3 having field and armature windings in the stator frame and the rotor thereof, respectively, wherein the shaft 2 is connected to a gasoline engine or other device generally designated by the block 1. The frame of the electrical machine 3 is free to move through a small arc, being restrained by a lever arm 15 mechanically affixed to the frame and bearing against the platform 13 of a platform scale 17. Both machines are mounted on a bed plate 5. The electrical power may be brought to or from the rotor windings of the machine by means of slip rings (not shown) and to the stator windings by means of blades 11a, 11b, 11c and 11d adapted to rotate within reservoirs 9a, 9b, 9c, and 9d, respectively without mechanical connection therebetween.

Figure 2:
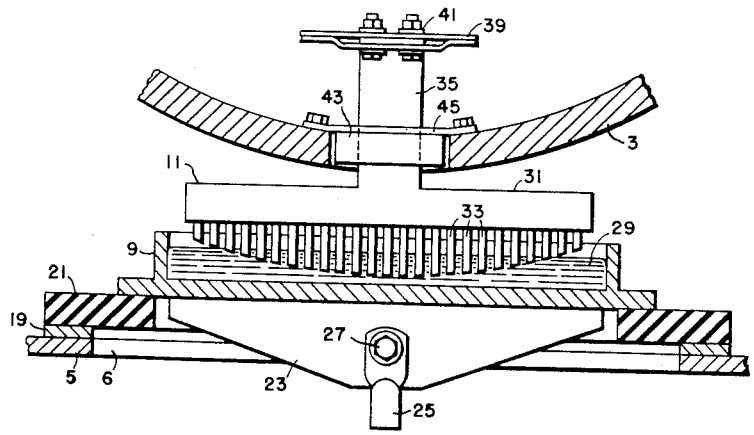
Fig. 2 is a detailed cross-sectional view of one embodiment of my invention.

With reference now to Fig. 2, there is shown in greater detail the construction of a section of the dynamometer including a typical knife blade 11 and the conductive reservoir 9 corresponding thereto. The reservoir is supported above the bed plate by an annular insulating member 21 of rectangular cross-section resting on a support member 19 affixed to the bed plate 5. Projecting through an opening or slot 6 of any convenient dimensions in the bed plate 5 is a conductive connecting plate 23 to which an electrical lead 25 is affixed by means of connection bolt 27 or any other convenient device. The connection plate is permanently affixed to the conductive reservoir 9. The reservoir and connection plate are preferably of copper or other highly conductive metal.

Figure 3:
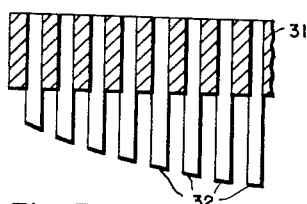
Fig. 3 is a portion of a cross-sectional view showing a preferred modification of my invention.

Within the reservoir is contained a pool of mercury or other similarly conductive fluid, 29. Blade member 11, which comprises a T-shaped member 35 of copper or other conductive material and a plurality of substantially parallel fingers 33 projecting therefrom, is affixed to the frame or shell 3 of the dynamometer by means of insulating material 43 secured to the frame by connection brackets 45. The head 31 of the T-shaped member may be integral with the projecting fingers 33 or, as shown in Fig. 3, the projecting fingers may be in the form of copper or steel pins 32 which are in tight fit with holes drilled through the head of the T-shaped member and brazed securely in place. The terminal edges of the fingers or pins follow an arcuate path so that substantially the same contact area will be projected into the mercury pool as the dynamometer frame rotates. Electrical leads 39 to the stator windings are secured to the body 35 of the T-shaped blade member by connection bolts 41.

As the shell or frame of the dynamometer rotates, due to the forces exerted thereon by the rotating machine 1 and the rotor windings of the dynamometer, the blade will also rotate but will, at all times, maintain a very low impedance contact with the mercury pool. At those speeds wherein vibration of the dynamometer becomes severe, the pins or fingers will be free to move through the mercury in a direction axial of the dynameter without exerting such pressure thereon as to splash the mercury out of the reservoir.

The invention is not to be restricted to the specific structural details, arrangement of parts or circuit connections herein set forth, as various modifications thereof may be effected without departing from the spirit and scope of this invention.

I claim as my invention:

1. An electrical connector for conducting electrical energy to the windings in the outer, relatively non-rotating member of an electrical dynamometer machine, comprising: a flat, blade-like member of conductive metal disposed within a reservoir containing a sufficient quantity of a conducting liquid to immerse one edge of said blade, the portion so immersed being divided into a plurality of substantially parallel fingers, said blade-like member being connected to the electrical windings in the stator of the dynamometer.

2. Apparatus for connecting electrical power to stator windings of an electrical machine having a stator structure adapted to be free to move through a given arc with substantially non-frictional opposition comprising: a plurality of reservoirs for electrically conductive liquid; a blade-like member corresponding to each of said reservoirs, a portion of said blade-like member being adapted to be inserted in said electrically conductive fluid, the portion of said blade-like member inserted in said fluid being divided into a plurality of substantially parallel conductive fingers.

3. Apparatus for connecting electrical power to stator windings of an electrical machine having a stator structure adapted to be free to rotate through a given arc with substantially non-frictional opposition comprising: a plurality of reservoirs for electrically conductive liquid; a blade-like member corresponding to each of said reservoirs, a portion of said blade-like member being adapted to be inserted in said electrically conductive fluid, the portion of said blade-like member inserted in said fluid being divided into a plurality of substantially parallel conductive fingers, the extreme edges of said fingers defining an arcuate path such that substantially the same contact area is immersed in said liquid upon rotation of said stator structure.

4. In a dynamometer comprising an electrical machine the stator frame of which is free to rotate, first means connected thereto adapted to prevent said rotation, and means for measuring the force exerted on the stator by said first means while preventing said rotation; connecting means for connecting electrical energy to stator windings on said electrical machine including a substantially T-shaped electrically conductive blade circumferentially affixed to said stator, electrically insulated therefrom and adapted to be electrically connected to said stator windings, a reservoir containing an electrically conducting fluid in which a portion of said blade is immersed, one edge of said blade being divided into plurality of parallel fingers for insertion into said conducting liquid.

5. In a dynamometer comprising an electrical machine the stator frame of which is free to rotate, first means connected thereto adapted to prevent said rotation, and means for measuring the force exerted on the stator by said first means while preventing said rotation; connecting means for connecting electrical energy to stator windings on said electrical machine including a substantially T-shaped electrically conductive blade circumferentially affixed to said stator, electrically insulated therefrom and adapted to be electrically connected to said stator windings, a reservoir containing liquid mercury in which a portion of said blade is immersed, one edge of said blade being divided into a plurality of parallel fingers for insertion into said conducting liquid.

6. In a dynamometer comprising an electrical machine the stator frame of which is free to rotate, first means connected thereto adapted to prevent said rotation, and means for measuring the force exerted on the stator by said first means while preventing said rotation; connecting means for connecting electrical energy to stator windings on said electrical machine including a substantially T-shaped electrically conductive blade circumferentially affixed to said stator, electrically insulated therefrom and adapted to be electrically connected to said stator windings, a reservoir containing an electrically conducting fluid in which a portion of said blade is immersed, and a plurality of substantially parallel conductive pins affixed to said blade and adapted to be inserted into said conducting liquid, the terminal edges of said pins defining an arcuate path so that substantially the same contact area is immersed in said fluid upon rotation of said frame.

7. In a dynamometer comprising an electrical machine the stator frame of which is free to rotate, first means connected thereto adapted to prevent said rotation, and means for measuring the force exerted on the stator by said first means while preventing said rotation; connecting means for connecting electrical energy to stator windings on said electrical machine including a substantially T-shaped electrically conductive blade circumferentially affixed to said stator, electrically insulated therefrom and adapted to be electrically connected to said stator windings, a reservoir containing an electrically conducting fluid in which a portion of said blade is immersed, the contact area of said blade with said liquid being divide dinto a plurality of substantially finger-like segments, the outer edges of said segments defining an arcuate path so that substantially the same contact area is immersed in said fluid upon rotation of said frame.

References Cited in the file of this patent

UNITED STATES PATENTS

| | | |
|---|---|---|
| 2,044,427 | Giesler | June 16, 1936 |
| 2,193,490 | Rehse | Mar. 12, 1940 |
| 2,494,244 | Jonard | Jan. 10, 1950 |
| 2,529,974 | Smith | Nov. 14, 1950 |

OTHER REFERENCES

Publication by V. N. Bednarski, on "Measurement of Mud Viscosities at High Temperatures," from the Petroleum Engineer, October 1948, pp. 192 and 194.